Aug. 13, 1940.                    W. B. FELL                    2,211,201
                        MACHINIST'S PRECISION LEVEL
                         Filed May 16, 1938           3 Sheets-Sheet 1
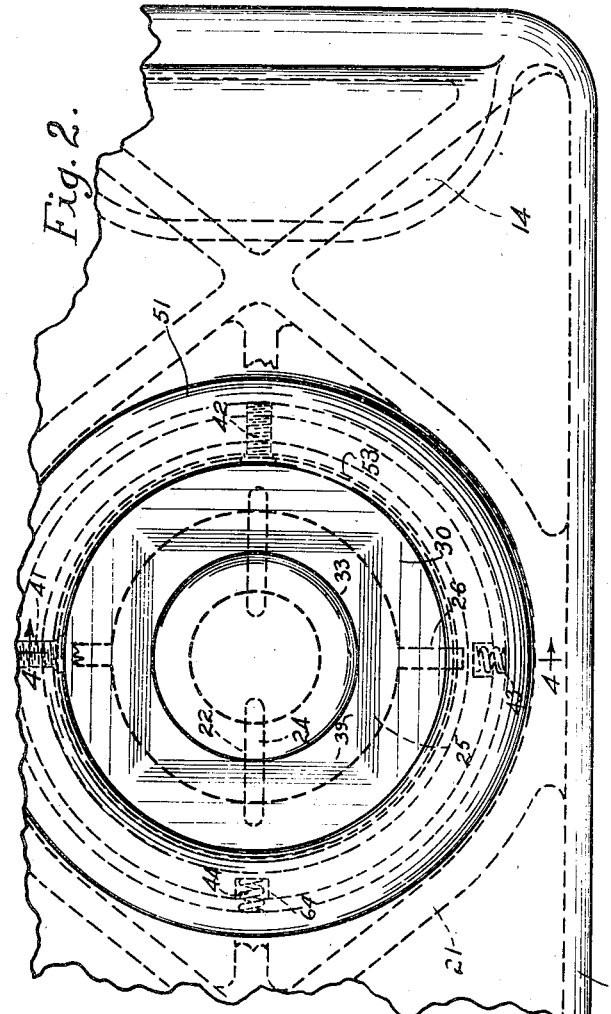
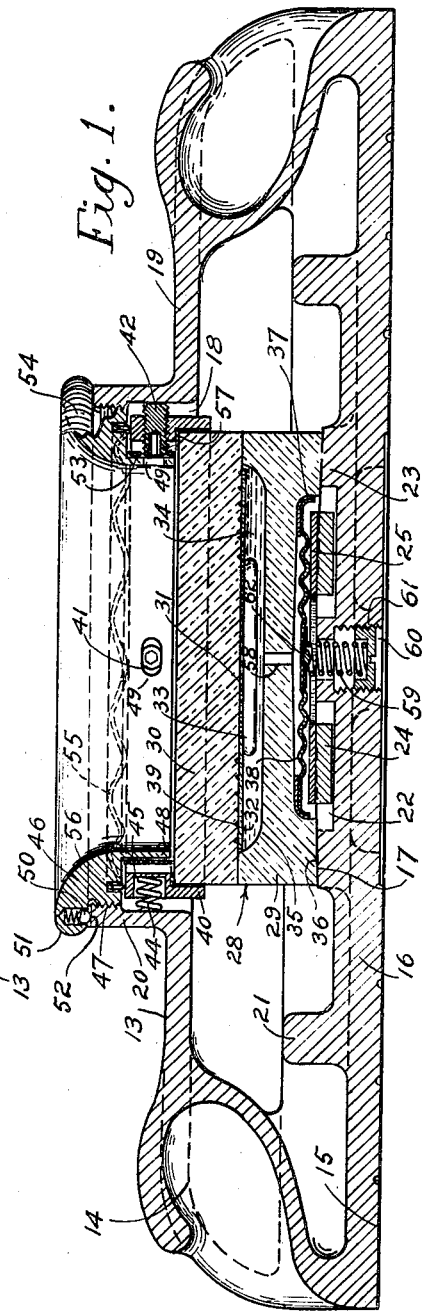
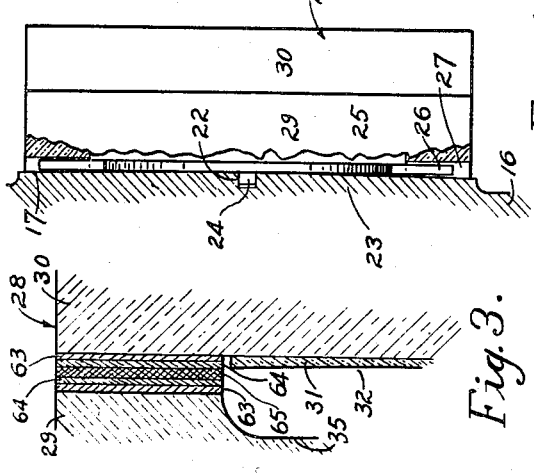
Inventor:
William B. Fell
By
McCanna, Wintercorn & Morsbach
Attys.

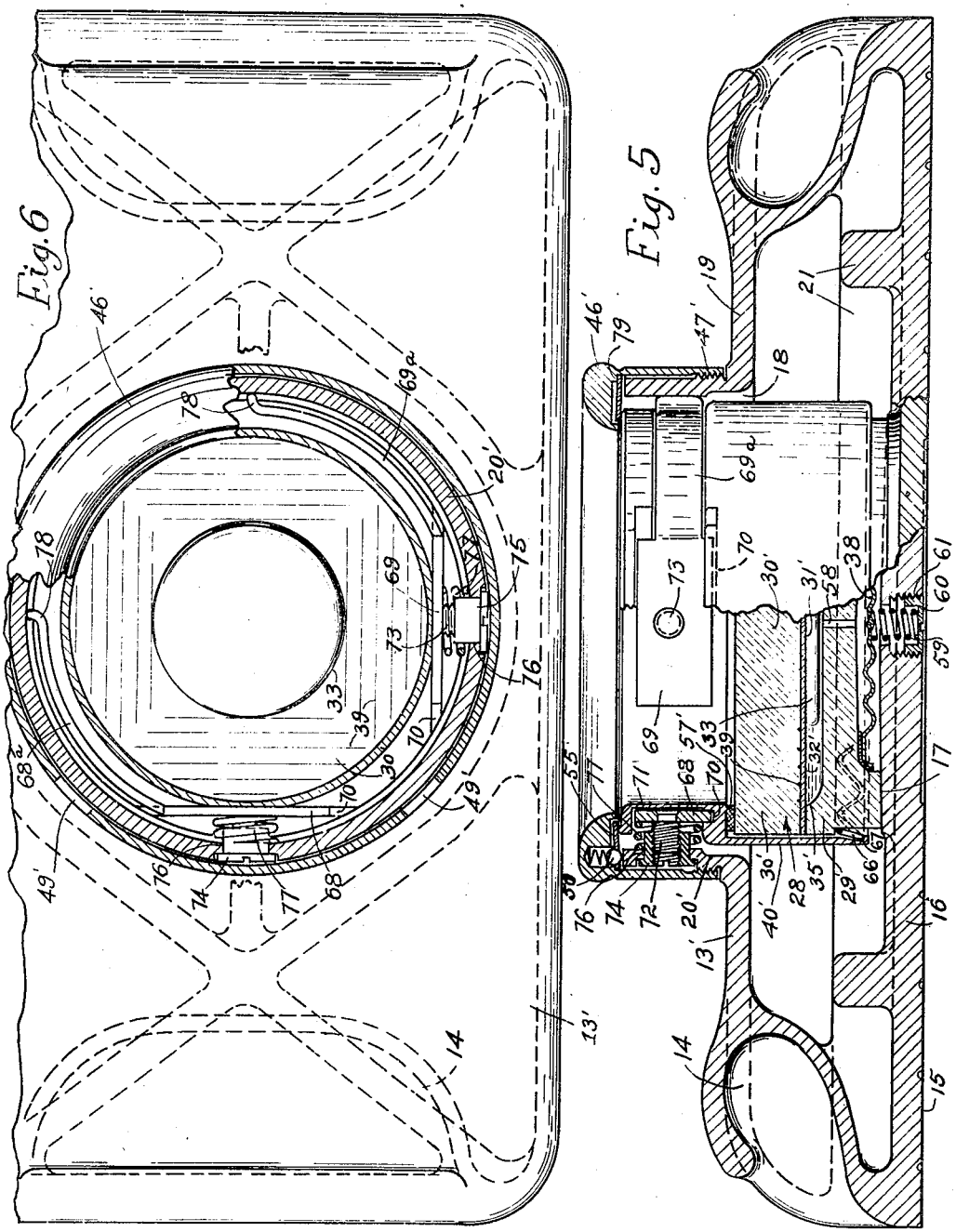

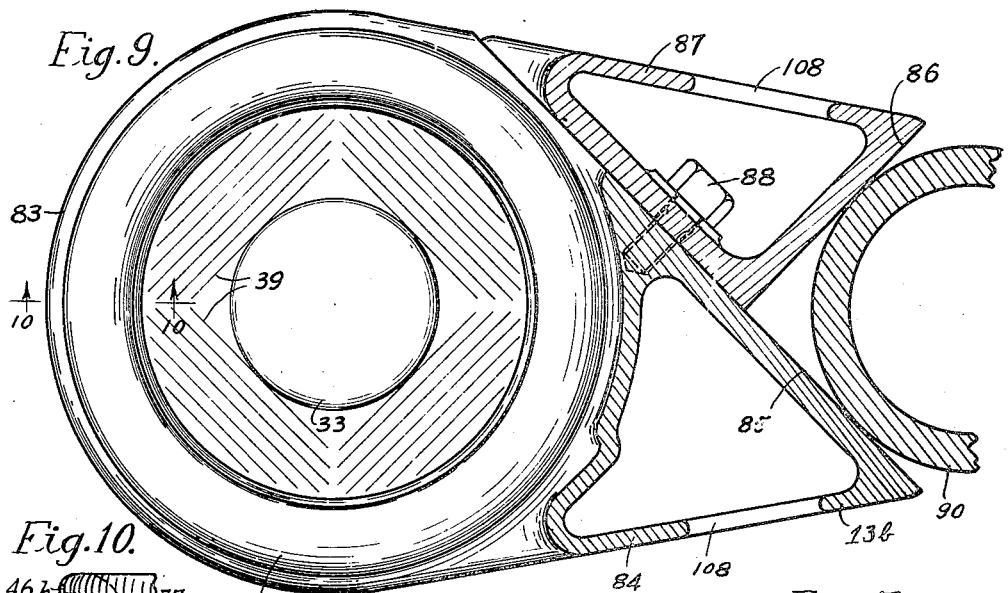
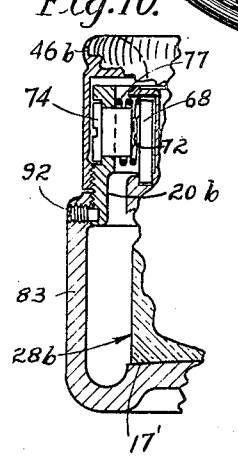
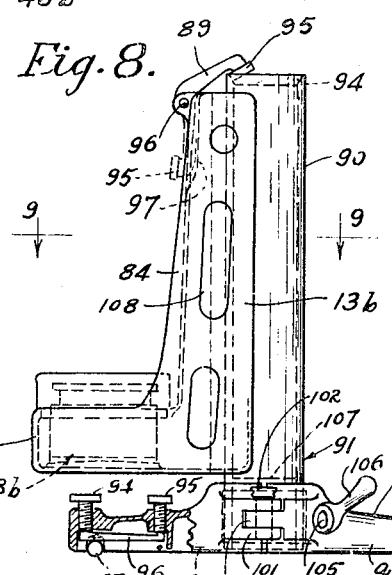
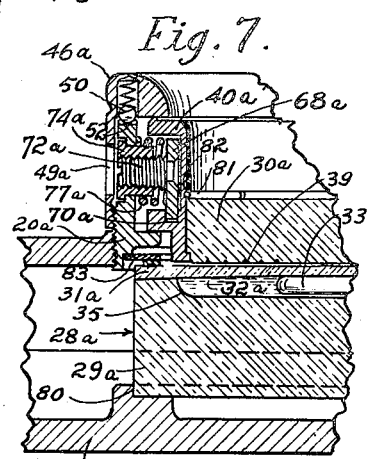
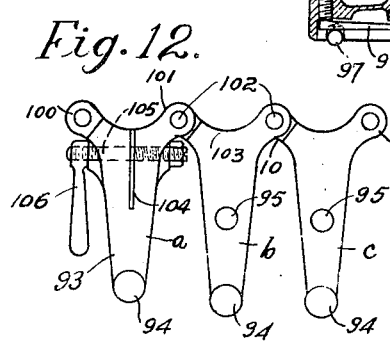
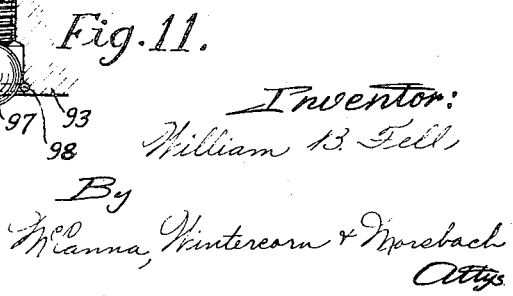

Patented Aug. 13, 1940

2,211,201

UNITED STATES PATENT OFFICE 2,211,201

MACHINIST'S PRECISION LEVEL

William B. Fell, Rockford, Ill.

Application May 16, 1938, Serial No. 208,173

29 Claims. (Cl. 33—212)

This invention relates to spirit levels generally, and is particularly concerned with one designed for quicker and more accurate leveling in machine tool work.

Tubular levels are now commonly used in machine shops, and it is awkward and tedious work to move these levels several times in positions at 90° from one another, and there is also greater danger of error if the level has to be reset, because the surface on which the level is placed in resetting might not be perfectly clean. It is therefore the principal object of my invention to provide a spherical type spirit level, making possible the leveling of a surface with one setting.

Another object of my invention is to provide a spherical type spirit level having a relatively large circular air bubble movable with respect to a spherical surface under a graduated glass disk that is adjustable accurately with respect to a spherical surface on the supporting frame or base, whereby to obtain greater sensitivity than has heretofore been obtainable in the tubular type of level.

A special feature is the provision of novel means in connection with the circular air bubble to compensate for changes in temperature so that the bubble will not vary in diameter too greatly.

Another important object of my invention is to provide a level of the kind mentioned of extremely simple and economical construction embodying screw adjusting means in 90° relationship to permit accurate setting of the level glass with respect to the frame on the spherical surface provided thereon, and spring means to maintain the glass under tension in its adjusted position to avoid shifting, together with simple and practical means for guiding the glass universally with respect to the frame while keeping the graduation lines exactly parallel to the edges of the base in any position of adjustment.

Another important object is to embody the spherical type level of my invention in either a horizontal type or vertical type instrument, the vertical instrument permitting quickly establishing a true vertical line so that vertical surfaces or surfaces that are to have a certain specified slant may be accurately checked in much less time than it usually takes with steel squares and dial indicators such as are now used.

Another object is to provide a level of the kind mentioned in which the vertical type level instrument is adapted to cooperate with a checking stand provided as part of the level equipment, the checking stand having a truly vertical standard relative to which the vertical type level instrument is adapted to be rotated while suspended from the top thereof, so as to permit accurately checking the adjustments of the graduations.

These and other objects of my invention will soon appear from the following detailed description, in which reference is made to the accompanying drawings, wherein—

Figure 1 is a central longitudinal vertical section through a horizontal type level instrument made in accordance with my invention;

Fig. 2 is a plan view of as much of Figure 1 as space would permit showing;

Fig. 3 is an enlarged sectional detail showing the level glass construction;

Fig. 4 is another sectional detail showing the level glass partly in section on the line 4—4 of Fig. 2, and illustrating the universal guide means for the level glass;

Fig. 5 is a view simiar to Figure 1 showing another level of modified or alternative construction;

Fig. 6 is a plan view of Fig. 5 with a portion broken away because of limited space on the drawings, and also showing the central portion in horizontal section to better illustrate the construction;

Fig. 7 is a fragmentary sectional detail showing still another modified or alternative construction;

Fig. 8 is a side view of a vertical type level instrument shown on a small scale and suspended on the standard of a checking stand in accordance with my invention;

Fig. 9 is a horizontal section on the line 9—9 of Fig. 8 on a larger scale;

Fig. 10 is a sectional detail on the line 10—10 of Fig. 9;

Fig. 11 is an enlarged sectional detail showing the screw adjustment for one of the legs of the tripod in Fig. 8, and Fig. 12 is a plan view of the tripod removed from the standard and folded ready to put in a carrying case.

Similar reference numerals are applied to corresponding parts throughout the views.

Referring first to Figs. 1–4 showing the preferred embodiment of my invention, the numeral 13 designates the frame or base which is of hollow, cast iron construction, and generally rectangular in form with pockets 14 molded therein at opposite ends wherein the operator may insert the four fingers of both hands in lifting the instrument out of its carrying case and placing it on the work. The bottom 15 is lapped true. The bottom wall 16 of the base has a spherical surface 17 formed on the top thereof at the center of the base below an opening 18 provided in the top wall 19 of the base. The opening 18 is defined by an upwardly projecting neck 20 cast integral with the top wall 19. The bottom wall 16 has a number of reenforcing ribs 21 cast integral therewith as shown, so as to eliminate danger of distortion and consequent unevenness of the bottom surface 15, without involving too much weight in the base. Longitudinal keyways 22 are provided in the central boss portion 23 in the base slidably receiving key projections 24 provided on the bottom of a ring 25, which in turn has diametrically opposed lugs 26 slidably engaged in transverse grooves 27 provided in the bottom of the level glass 28. The latter comprises a lower piece 29 and an upper piece 30, both of glass, suitably joined together, with a thin layer of clear glass enamel 31 applied to the bottom of the upper piece having its bottom surface 32 ground spherically concave to give circular form to an air bubble 33 floating on the top of the ether pool 34 in the basin 35 formed in the lower piece 29. The bottom surface 36 of the lower piece 29 is spherical and is conformed on the same radius as the spherical surface 17 on the base. The bottom of the lower piece 29 is also recessed as at 37 so as to accommodate the guide ring 25, and also a diaphragm 38 of annularly corrugated spring metal suitably secured to the bottom of the lower piece 29 within the recess 37 for a purpose which will soon appear. The top of the lower piece 29 is covered with white enamel throughout the basin 35 to provide a contrasting background for the graduation lines 39 scored in the bottom of the upper piece 30 before the application of layer 31. The lines 39 extend at right angles to one another, parallel to the edges of the base 13, as clearly appears in Fig. 2. Each scale division in the present case is equal to one-tenth thousandth of an inch of movement in one linear foot, so that error may be read directly in ten-thousandths to the foot in any direction. This is well in excess of the ordinary needs of the machine tool industry. In Fig. 2 the bubble 33 appears in the exact center with the innermost graduation lines tangent thereto, and it is obvious that any out-of-level condition can be detected at once by the position of the bubble 33 with respect to the graduation lines, and one may level a surface with one setting, instead of having to move the level several times in positions at 90° to one another, as with the tubular kind of levels now commonly in use in machine shops. It will soon appear how this same advantage of quick accurate reading is obtained in a vertical type instrument, as distinguished from the horizontal type here shown.

A ring 40 rests on top of the level glass 28 and fits freely within the opening 18 in the top wall 19 of the base to provide a means for adjusting and holding the level glass in adjusted position. Two socket set screws 41 and 42 are threaded radially in the ring 40 exactly 90° apart and bear at their outer ends against the wall of the neck 20 so as to cause a transverse adjustment of the level glass upon outward threading of the screw 41, and a longitudinal adjustment of the level glass by outward threading of the screw 42. Coiled compression springs 43 and 44 are received in sockets 45 in the ring 40 in diametrically opposed relation to the screws 41 and 42, respectively, and bear at their outer ends against the wall of the neck 20 so as to urge the ring 40 laterally and longitudinally in the direction of the screws 41 and 42 and thereby keep the level glass 28 under spring tension at all times to hold it in adjusted position. In the transverse adjustment of the level glass 28 by means of screw 41, the ring 25 keeps the level glass 28 with its graduation lines 39 exactly parallel with the edges of the base 13, as the lugs 26 slide in the groove 27. In like manner, when the screw 42 is adjusted, the key projection 24 sliding in the keyways 22 keep the level glass 28 from turning, so that the graduation lines 39 are kept in exact parallelism with the edges of the base 13. The extent of adjustment can be easily checked by noting the movement of the graduation lines with respect to the bubble 33, and, of course, if the adjustment is made in order to re-center the level glass with reference to the air bubble the operator stops adjusting just as soon as the condition illustrated in Fig. 2 is obtained, namely, when the four graduation lines on the four sides of the bubble are exactly tangent thereto. A hold-down ring 46 is threaded as at 47 in the neck 20 and has an annular flange 48 with slots 49 therein through which the screws 41 and 42 are adjustable with an end wrench. These slots 49 come into register with the screws only in one position where a spring pressed ball detent 50 in the rim 51 engages in a radial depression 52 provided therefor in the top of the neck 20. Otherwise, a spring ring 53 which is held against turning by means of the two screws 41 and 42, covers the slots 49, when the hold-down ring 46 is screwed down tight. The rim 51 of the ring 46 is knurled as at 54 to facilitate hand operation thereof. A wavy spring 55 seated in an annular groove 56 in the bottom of the ring 46 bears on top of the ring 40 so as to hold the level glass 28 down under fairly heavy spring pressure when the ring 46 is tightened. 57 is a suitable gasket interposed between the ring 40 and the top of the level glass 28.

The basin 35 communicates with the diaphragm chamber therebeneath through the center hole 58, and a spring 59 bearing against the bottom of the diaphragm 38 is held compressed by a plug 60 threaded in the base 13, as at 61. In the event of temperature change the diaphragm will move in or out, as the case may be, and the bubble will not vary in diameter too greatly. Then too, should the operator desire to increase or decrease the size of the bubble for any reason, it is a simple matter to turn the plug 60 in one direction to contract the bubble 33 and in the opposite direction to expand the same. The small plug shown at 62 closes the center hole in the diaphragm 38 and is suitably formed by soldering, after the level glass 28 has been filled with liquid ether.

The parts 29 and 30 of the level glass 28 may be secured together in any suitable or preferred manner. In Fig. 3 I have illustrated by a greatly enlarged sectional detail a method which I have found to be especially satisfactory for this purpose. The numeral 63 indicates a layer of silver on each of the parts 29 and 30, which is applied by spraying a silver nitrate solution on these parts while they are heated about red hot, the silver deposit fusing permanently onto the glass. The silver surface is then electroplated with copper, indicated by the numeral 64, which is in turn tinned with a low melting point bismuth solder, indicated by the numeral 65. The two parts 29 and 30 are then sweated together by heating slowly in a furnace. During the silvering the white enamel can be applied in the basin 35, the enamel being baked in a furnace. The two parts 29 and 30 are carefully annealed after the heating. It is obvious that with this construction the volatile ether is permanently confined when the plug 62 is applied after filling.

The corrugated diaphragm 38 is similarly soldered to the bottom of the bottom part 29, following the same procedure of first spraying the glass part with a silver nitrate solution and then electroplating with copper, and thereafter tinning with a low melting point bismuth solder. When the tinned diaphragm 38 and the tinned glass part 29 are placed in a furnace, the two pieces can be sweated together by heating slowly, similarly as described above for the parts 29 and 30.

In operation, it is clear that the bubble 33 cooperating with the spherical surface 32 seeks the highest point in the basin 35 and promptly comes to rest, indicating by reference to the graduation lines 39 the extent of out-of-true condition. The fact that the spherical surface 17 is on a smaller radius than the surface 32, although its center is on the same vertical axis with the center of the surface 32, enables quicker adjustment of the graduation lines 39 with respect to the air bubble 33. Accurate reading is possible, too, because the graduation lines 39 are in such close proximity with the air bubble. The ring 25 guides the level glass in its adjustment so that it cannot turn out of the position shown, with its graduation lines 39 parallel to the edges of the base 13, whether either or both of the screws 41 and 42 are adjusted.

Referring now to Figs. 5 and 6, the base 13' closely resembles the base 13 of Figs. 1 and 2, and has a spherical seat 17' at the center thereof for support of the level glass assembly 28'. The level glass 28' has the parts 29' and 30' suitably cemented together with the glass enamel layer 31' interposed therebetween and providing the spherical surface 32' in the same relation to surface 17' as surface 32 has to 17. However, contact alone may be relied upon to seal the basin 35', in which event a wavy wire spring 66 snapped into the groove 67 in the ring 40', presses the glasses together. The level glass assembly 28' is adjustable by means of the ring 40', but in this construction the screw adjusting means and the guide means are both incorporated in the upper portion of the instrument, instead of having the screw adjusting means in the upper portion and the guide means in the lower portion, as in Figs. 1 and 2. In this case, guide strips 68 and 69 are disposed at right angles to one another and slidably engaged in grooves 70 provided therefor on the thicker walled upper portion 71 of the ring 40'. Studs 72 and 73 are rigid with the strips 68 and 69 and thread in adjusting nuts 74 and 75, respectively, bearing in holes 76 provided therefor in the upstanding neck 20' of the base 13' exactly 90° apart. Springs 77 working between the inside of the neck 20' and the strips 68 and 69 cause the ring 40' to move longitudinally or transversely with respect to the base 13' in one direction, whereas the adjusting nuts 74 and 75 serve to positively adjust the ring in the opposite direction, when adjusted. The strips 68 and 69 both have arcuate extensions as indicated at 68a and 69a, the outwardly bent ends 78 of which contact the inside of the neck 20' to assume end thrust on these strips incident to the adjustment of the adjusting nuts 74 and 75. Obviously, the guides working in right angled relationship serve to keep the level glass assembly 28' from turning out of position, thereby keeping the graduation lines 39 parallel with the edges of the base. 46' is a hold-down ring which fits over the outside of the neck 20' and threads thereon as at 47'. This ring has holes 48' therein which, when the ring is turned to the proper position, register with the adjusting nuts 74 and 75. The latter are, however, normally concealed, because when the ring 46' is tightened, the holes 49' are not in register therewith, as shown in Fig. 6. A spring steel ring 55' working between an annular shoulder 79 on the ring 46' and the top of the ring 40', serves to hold the level glass assembly down tightly on the seat 17' under spring pressure, when the ring 46' is tightened. 57' is a washer of soft material which will conform itself to the top of the level glass in the tightening of the ring 46'. In this case as in the other just described, the spring pressed ball detent 50 serves to hold the ring 46' against turning when the holes 49' are in register with the two adjusting nuts 74 and 75. The operation of this level is obviously the same as the level first described.

Fig. 7 shows another construction having a level glass 28a in which the bottom part 29a and cover glass 31a are fixed with respect to the base 13a in a recess 80, the cover glass 31a providing the spherical surface 32a for cooperation with the air bubble 33, while the other top glass 30a, carrying the graduation lines 39, is arranged to be adjusted longitudinally and/or transversely with respect to the rest of the level glass assembly. The ring 40a in this case therefore cooperates only with the glass 30a, the same being mounted in the ring on a taper and held in place by means of a split wire ring 81 snapped into an annular internal groove 82 in the ring 40a, as shown. In this case, a separate ring 20a is threaded into the base to provide the equivalent of the neck 20 of Figure 1 or 20' of Fig. 5, and, as shown, serves to clamp the parts 29a and 31a in place under the spring ring 83. The rest of this construction, in so far as the screw-threaded adjusting means and guide means are concerned, is the same as shown in Figs. 5 and 6, and similar numerals have been accordingly applied. The operation of this level will be substantially the same as the operation of both of the levels previously described.

In Figs. 8 and 9, I have shown a vertical type instrument having an L-shaped frame 13b, the horizontal portion 83 of which contains the level glass 28b, and the vertical portion 84 of which provides one side 85 of a V-channel adapted to fit against the vertical corner surfaces of a machine housing or upright, the other side 86 of said V-channel being provided by an elongated block 87 detachably secured as by means of bolts 88 to the vertical portion 84 of the frame 13b. Ordinarily, the angle between the surfaces 85 and 86 will be 90°, as shown, but, of course, this angle may be altered by changing both the block 87 and the hanger 89 by means of which the present instrument is adapted to be suspended on a standard 90 of a checking stand shown at 91 in Fig. 8. It will be noted that the graduation lines 39 are shown in Fig. 9 as parallel to the surfaces 85 and 86. The bubble 33 will, therefore, be tangent to the four graduation lines bounding the circle thereof when the housing or upright on which the instrument is placed is truly vertical, but any error from a true perpendicular in any direction will cause a corresponding deviation in position of the bubble 33 with respect to the graduation lines 39. For example, in the case of a milling machine housing which should be mounted to lean two-thousandths of an inch in eight feet of height but be vertical on the side, the bubble would be one-quarter thousandths division to the front and on center sideways. One can therefore read the instrument at a glance in one setting, and there is a great saving in time and much closer accuracy as compared with the same operation done the old way with steel squares and dial indicators. In passing, it will be understood that the construction of the level glass and its adjusting and guiding means may be the same as shown in Figs. 1 and 2, or as shown in Figs. 5 and 6, or Fig. 7. The adjusting means in this instance, as shown in Fig. 10, corresponds to what is shown in Figs. 5 and 6, and the parts have been numbered accordingly, except that a separate steel ring 20b takes the place of the integral neck provided in the other construction, and is threaded in place and locked by a set screw 92, and the hold-down ring 46b threads thereon.

The checking stand 91 comprises the standard 90 and tripod base 93. The standard 90 is tubular and has an annular inclined track 94 formed in the upper end thereof on which a roller 95 on the hanger 89 attached to the level instrument is adapted to run. The hanger 89 is pivoted at 96 on the upper end of the frame 13b, which, as shown, has a groove 97 adapted to accommodate the hanger 89 in a retracted out-of-the-way position, as indicated in dotted lines in Fig. 8. The level instrument is free to rotate about the standard 90 as an axis, and in that way one can check the adjustment of the graduations 39 on the level, in order to eliminate errors. Obviously, if the bubble 33 remains in the same position when the instrument is turned from one position to other positions at 90°, the standard 90 is then known to be truly vertical, and one can then center the graduations 39 with respect to the bubble and be assured thereafter of correct readings. Each of the three legs A, B and C of the tripod base 93 has an adjusting screw 94 on the outer end thereof for coarse adjustment of the standard 90 to a truly vertical position. The legs B and C have other screws 95 for the fine adjustment, the latter cooperating with fulcrum beams 96 inside the legs B and C, as clearly appears in Fig. 8, said levers having engagement at their opposite ends with the screws 94 and 95 and resting intermediate their ends on the balls 97 that are adapted to rest on the surface on which the stand 91 is placed. Each of the balls 97 may be retained in a socket in its cooperating tripod leg, as shown in Fig. 11, by means of a split ring 98 snapped into an annular groove 99. The balls are therefore retained, although free to move up or down with relation to the tripod legs to the extent permitted by the adjustment of the cooperating adjusting screws.

Fig. 12 shows how the base 93 can be folded to put in a carrying case. Each leg of the base has a perforated ear 100 on one side of the inner end and a bifurcated perforated ear 101 on the other side of the inner end, and pins 102 are adapted to be entered through the inter-engaged ears 100 and 101 of adjacent legs, each of the legs having the arcuate inner end 103 thereof adapted to encircle approximately one-third of the lower end of the standard 90. Three pins, 102, therefore suffice to assemble the base detachably on the lower end of the standard 90. The one leg A is split longitudinally, as indicated at 104, and has a bolt 105 extending transversely of the split portion and provided with a hand nut 106 threaded on the projecting end thereof, which, when turned, serves to contract the split inner end of the leg A sufficiently to clamp the tripod base on the lower end of the standard. The standard 90 is made of steel tubing, re-enforced at the lower end thereof by disks 107 welded in place therein. The standard is hardened and accurately ground on the outside and also on the track portion 94. In passing, it will be observed that the level instrument has hand holes 108 on the vertical portion of the frame 13b thereof to permit easy handling of the instrument, when placing the same on the checking stand, and also when applying the same to a machine tool member to be checked with the level.

It is believed the foregoing description conveys a good understanding of the objects and advantages of my invention. The appended claims have been drawn with a view to covering all legitimate modifications and adaptations.

I claim:
1. A level of the character described comprising a horizontal frame, a level glass structure supported thereon and including a pool of liquid containing a circular air bubble movable under a spherical surface relative to graduation lines extending at right angles to one another, means slidably adjustably supporting the level glass structure on said frame comprising a spherical surface on the frame and a matching spherical surface on the structure both on a center on the same vertical axis with the center of the first named spherical surface, means at right angles to one another and also at right angles to the graduation lines aforesaid for threadedly adjusting the level glass structure relative to the frame, and means for guiding said level glass structure in its adjustment relative to the frame to keep the graduation lines thereof in one position of adjustment of the structure parallel to the lines in another position of adjustment of the structure.

2. A level comprising a bottom member having a basin therein adapted to contain a pool of liquid with an air bubble therein, a flat bottomed cover glass covering the basin so that the bubble is visible therethrough, said cover glass having graduation lines on the bottom surface thereof, and a thin plano-concave transparent medium disposed with its flat face in abutment with the bottom of the cover glass and with the bubble under the concave face, the concave face being spherical so as to give the air bubble a circular form.

3. A leveling instrument comprising a horizontal frame member, a level structure adapted to be supported thereon and comprising a bottom member having a basin therein adapted to contain a pool of liquid with an air bubble therein, a flat bottomed cover glass covering the basin so that the bubble is visible therethrough, said cover glass having graduation lines on the bottom surface thereof, and a thin plano-concave transparent medium disposed with its flat face in abutment with the bottom of the cover glass and with the bubble under the concave face, the concave face being spherical so as to give the air bubble a circular form, the bottom member of the level structure having a spherical surface the center of which is on the same vertical axis with the spherical surface on the plano-concave medium, and said frame member having a spherical seating surface thereon complementary to the spherical surface on the bottom member of the level structure, the latter being slidably adjustably supported on said seating surface, and means for adjusting the level structure lengthwise and transversely relative to the frame member while holding the level structure against turning with respect to the frame member.

4. In a leveling instrument comprising a rectangular frame member having a flat bottom surface and having a spherical top surface adapted to support a level structure thereon, a level structure having a complementary spherical bottom surface slidably adjustably engaging the spherical top surface on the frame member, said level structure including a basin containing liquid with an air bubble therein, a cover glass structure over the basin providing a spherical concave bottom surface giving the air bubble a circular form, said cover glass structure having graduation lines thereon in juxtaposition to the circular air bubble extending at right angles to one another parallel to the edges of the frame member, said lines forming squares circumscribing the bubble in the central position thereof, and means for adjusting the level structure longitudinally and transversely relative to the frame member while preventing rotation of said level structure relative to the frame member.

5. A level comprising a bottom member having a basin therein adapted to contain a pool of liquid with an air bubble therein, a cover glass structure covering the basin so that the bubble is visible therethrough, said cover glass structure providing a spherical concave bottom surface giving the air bubble a circular form, said cover glass structure having graduation lines thereon in juxtaposition to the circular air bubble and extending at right angles to one another, means providing an auxiliary liquid chamber in communication with the basin, and a flexible diaphragm forming a liquid retaining wall of said auxiliary chamber.

6. A level comprising a bottom member having a basin therein adapted to contain a pool of liquid with an air bubble therein, a cover glass structure covering the basin so that the bubble is visible therethrough, said cover glass structure providing a spherical concave bottom surface giving the air bubble a circular form, said cover glass structure having graduation lines thereon in juxtaposition to the circular air bubble and extending at right angles to one another, the bottom member having an opening provided therein extending downwardly from the basin, a flexible diaphragm forming one wall of an auxiliary fluid chamber on the bottom member communicating with said opening, and means for adjusting the position of the diaphragm with respect to the bottom member so as to draw fluid out of the basin into the auxiliary chamber, or force fluid from the auxiliary chamber into the basin.

7. As an article of manufacture, a cover glass for a spherical spirit level having a flat bottom scored to provide graduation lines in transverse relation, and a thin plano-concave layer of transparent material covering the bottom of said cover glass with the concave face outermost, said concave face being spherically conformed on a radius that is large in relation to the dimensions of said cover glass.

8. A leveling instrument as set forth in claim 4, including a flexible diaphragm on the level structure forming one wall of an auxiliary fluid chamber on the bottom member communicating with said basin, said instrument including a coiled compression spring engaging said diaphragm at one end, and a plug threadedly adjustable in the frame member and engaging the other end of said spring to adjust the diaphragm resiliently relative to said level structure.

9. A leveling instrument as set forth in claim 4, including a flexible diaphragm on the level structure forming an adjustable wall of an auxiliary fluid chamber communicating with the basin, the instrument including spring means normally urging said diaphragm inwardly relative to the level structure.

10. A leveling instrument as set forth in claim 4, including a flexible diaphragm on the level structure forming an adjustable wall of an auxiliary fluid chamber communicating with the basin, the instrument including means threadedly adjustable on the frame member for adjusting said diaphragm inwardly relative to the level structure.

11. A device of the character described comprising a frame member having vertically spaced top and bottom walls, the bottom wall having a spherical seating surface on the top thereof in concentric relation with a neck defining a circular opening provided in the top wall, a circular level structure having circular engagement with the seating surface and having a fluid filled basin therein containing a circular air bubble movable under a concave spherical surface relative to graduation lines in juxtaposition to the bubble, a guide ring interposed between the level structure and the bottom wall of the frame member having one set of projections slidably engaged in guideways on the frame member and another set of projections at right angles to the first set slidably engaged in guideways on the level structure to permit slidable adjustment of the level structure relative to the frame member while preventing rotation of said level structure, an adjusting ring surrounding the top of the level structure having adjusting screws threaded radially therein 90° apart and engaging the inside of the neck on the top wall of the frame member, spring means acting between the ring and neck in diametrically opposed relation to said screws, and a hold-down ring threaded on the neck and serving to retain the level structure and adjusting ring in place in the frame member.

12. A device as set forth in claim 11, wherein the level structure includes a flexible diaphragm forming an adjustable wall of an auxiliary fluid filled chamber communicating with the fluid filled basin of said level structure, and means threadedly adjustable relative to the bottom of the frame member and having operative engagement with the diaphragm through the guide ring for adjusting said diaphragm relative to said level structure, for the purpose described.

13. A device as set forth in claim 11, including handle portions at opposite ends of the frame member joining the top and bottom walls thereof.

14. A level comprising a bottom member having a basin therein adapted to receive a pool of liquid with an air bubble therein, a thin plano-concave cover glass for said bottom member having the concave side thereof downward and formed spherical to give circular form to the air bubble therebeneath, a top glass having a flat bottom provided with graduation lines adjustable relative to the bubble when the top glass is moved relative to the top surface of the cover glass, and means for adjusting the top glass and holding the same in adjusted position relative to the cover glass.

15. A leveling instrument comprising a horizontal frame member, a level structure supported thereon, said structure comprising a bottom member having a basin therein adapted to receive a pool of liquid with an air bubble therein, a thin plano-concave cover glass for said bottom member having the concave side thereof downward and formed spherical to give circular form to the air bubble therebeneath, a top glass having a flat bottom provided with graduation lines adjustable relative to the bubble when the top glass is moved relative to the top surface of the cover glass, and means for adjusting the top glass longitudinally and transversely relative to the frame member and holding the same in adjusted operative relationship to the cover glass.

16. A vertical leveling instrument comprising an L-shaped frame member providing a horizontal portion adapted to support a spirit level structure and a vertical portion of V-shaped cross-section adapted to be placed against an upright member the position of which is to be checked for true vertical disposition, and a spirit level structure in the horizontal portion of said frame member including a fluid filled basin containing an air bubble movable under a concave spherical surface giving circular form to the bubble.

17. A vertical leveling instrument comprising an L-shaped frame member providing a horizontal portion adapted to support a spirit level structure and a vertical portion of V-shaped cross-section adapted to be placed against an upright member the position of which is to be checked for true vertical disposition, and a spirit level structure in the horizontal portion of said frame member including a fluid filled basin containing an air bubble movable under a concave spherical surface giving circular form to the bubble, said level structure further including graduation lines in juxtaposition to the air bubble and in transverse relation to one another parallel to the surfaces of the V-shaped vertical portion of the frame member.

18. In combination, a vertical leveling instrument comprising an L-shaped frame member providing a horizontal portion adapted to support a spirit level structure and a vertical portion of V-shaped cross-section adapted to be placed against an upright member the position of which is to be checked for true vertical disposition, and a spirit level structure in the horizontal portion of said frame member including a fluid filled basin containing an air bubble movable under a concave spherical surface giving circular form to the bubble, a checking stand comprising a vertical cylindrical standard against which the V-shaped vertical portion of the aforesaid frame member is adapted to be engaged, and means for suspending said frame member by its upper end on the upper end of said standard for rotation bodily relative to the standard while operatively engaged with the side thereof.

19. A level of the character described comprising a horizontal frame, a level glass structure supported thereon and including a pool of liquid containing a circular air bubble movable under a spherical surface relative to graduation lines, means slidably adjustably supporting the level glass structure on said frame comprising a spherical surface on the frame and a matching spherical surface on the structure, means at right angles to one another for adjusting the level glass structure relative to the frame, and means for guiding said level glass structure in its adjustment relative to the frame to prevent rotation of said structure.

20. A level of the character described comprising a horizontal frame, a level glass structure supported thereon and including a pool of liquid containing a circular air bubble movable under a spherical surface relative to graduation lines extending at right angles to one another, means slidably adjustably supporting the level glass structure on said frame comprising a spherical surface on the frame and a matching spherical surface on the structure both on a center on the same vertical axis with the center of the first named spherical surface, and means at right angles to one another and also at right angles to the graduation lines aforesaid for threadedly adjusting the level glass structure relative to the frame.

21. A level of the character described comprising a horizontal frame, a level glass structure supported thereon and including a pool of liquid containing a circular air bubble movable under a spherical surface relative to graduation lines extending at right angles to one another, means slidably adjustably supporting the level glass structure on said frame comprising a spherical surface on the frame and a matching spherical surface on the structure both on a center on the same vertical axis with the center of the first named spherical surface, means at right angles to one another and also at right angles to the graduation lines aforesaid for threadedly adjusting the level glass structure relative to the frame, spring means in diametrically opposed relation to the last mentioned means maintaining said level glass structure under tension toward said means, and means for guiding said level glass structure in its adjustment relative to the frame to keep the graduation lines thereof in one position of adjustment of the structure parallel to the lines in another position of adjustment of the structure.

22. A level of the character described comprising a horizontal frame, a level glass structure supported thereon and including a pool of liquid containing a circular air bubble movable under a spherical surface relative to graduation lines extending at right angles to one another, means slidably adjustably supporting the level glass structure on said frame comprising a spherical surface on the frame, and a matching spherical surface on the structure both on a center on the same vertical axis with the center of the first named spherical surface, means at right angles to one another and also at right angles to the graduation lines aforesaid for threadedly adjusting the level glass structure relative to the frame, and spring means in diametrically opposed relation to the last mentioned means maintaining said level glass structure under tension toward said means.

23. A leveling instrument comprising a support, a level structure thereon comprising a basin member adapted to contain a pool of liquid with an air bubble floating thereon, a flat topper cover glass through which the bubble is visible, said cover glass having a concave spherical surface on the bottom thereof giving circular form to the air bubble and also having on the same side thereof bubble circumscribing squares in concentric relation with said cover glass and in closely spaced relation to one another, said squares permitting precision measurement by reason of their close proximity with the air bubble, and means for universally tiltably adjusting said level structure relative to said support while preventing rotation thereof with respect to said support, said bubble circumscribing squares having the sides thereof in substantially parallel relation to the edges of said support.

24. A device of the character described comprising a support having a spherical seat thereon, a circular level structure having a fluid filled basin therein containing a circular air bubble movable under a concave spherical surface, a guide member interposed between the level structure and said support having sliding engagement with said support in one direction and sliding engagement with said level structure in a transverse direction, an adjusting ring surrounding said level structure and adapted to communicate adjustment thereto in either of two transverse directions relative to said support, screw means acting between the support and said ring in transverse directions to adjust the level structure relative to the support, and hold-down means acting between the support and the level structure to secure the same in adjusted position.

25. A device of the character described comprising a support, a level structure having a fluid filled basin therein containing a circular air bubble movable under a concave spherical surface, means for supporting said level structure on said support for universal tilting adjustment relative thereto, and hold-down means acting between the support and the level structure for securing the same in adjusted position.

26. A device of the character described comprising a support, a level structure having a fluid filled basin therein containing a circular air bubble movable under a concave spherical surface, means for supporting said level structure on said support for universal tilting adjustment relative thereto, means for preventing rotation of said level structure relative to said support in its universal adjustment, and hold-down means acting between the support and the level structure for securing the same in adjusted position.

27. A level of the character described comprising a horizontal frame, a level glass structure supported thereon and including a pool of liquid containing a circular air bubble movable under a spherical surface relative to graduation lines extending at right angles to one another, and means slidably adjustably supporting the level glass structure on said frame comprising a spherical surface on the frame and a matching spherical surface on the structure both on a center on the same vertical axis with the center of the first named spherical surface.

28. A level of the character described comprising a horizontal frame, a level glass structure supported thereon and including a pool of liquid containing a circular air bubble movable under a spherical surface relative to graduation lines extending at right angles to one another, and means slidably adjustably supporting the level glass structure on said frame comprising a spherical surface on the frame and a matching spherical surface on the structure both on a center on the same vertical axis with the center of the first named spherical surface, said level glass structure having the graduation lines provided on the bottom thereof in close proximity with the bubble and forming concentric squares in concentric relation with the aforesaid vertical axis.

29. A device of the character described comprising a support, a level structure having a fluid filled basin therein containing a circular air bubble movable under a concave spherical surface in concentric relation to a vertical axis normal to the level structure, means for supporting said level structure on said support for universal tilting adjustment relative thereto, means for preventing rotation of said level structure relative to said support in its universal adjustment, and hold-down means acting between the support and the level structure for securing the same in adjusted position, said level structure having graduation lines provided on the bottom thereof in close proximity with the bubble and extending in transverse relation to one another and forming concentric squares in concentric relation with the aforesaid vertical axis.

WILLIAM B. FELL.